United States Patent [19]

Guhl et al.

[11] 3,946,826
[45] Mar. 30, 1976

[54] VEHICLE DASH ASSEMBLY

[75] Inventors: Richard E. Guhl; Alfred W. Sieving, both of Decatur, Ill.

[73] Assignee: Caterpillar Tractor Co., Peoria, Ill.

[22] Filed: Jan. 29, 1975

[21] Appl. No.: 545,257

[52] U.S. Cl. ................................. 180/90; 292/338
[51] Int. Cl.² ........................................ B60K 26/00
[58] Field of Search ......... 180/89 R, 90; 280/150 B; 296/78; 292/338, 268

[56] References Cited
UNITED STATES PATENTS

| | | | |
|---|---|---|---|
| 1,522,636 | 1/1925 | Landine | 292/268 X |
| 1,835,456 | 12/1931 | Bernard | 180/90 |
| 2,630,187 | 3/1953 | DiLoreto | 180/90 |
| 2,760,805 | 8/1956 | Stevens | 292/268 X |
| 2,876,857 | 3/1959 | Beyerstedt | 180/90 |
| 2,976,947 | 3/1961 | Cruthis | 180/90 |
| 3,337,253 | 8/1967 | Laukzemis | 292/338 X |
| 3,434,559 | 3/1969 | Froitzheim | 180/90 |

FOREIGN PATENTS OR APPLICATIONS

| | | | |
|---|---|---|---|
| 216,356 | 5/1924 | United Kingdom | 180/90 |
| 12,274 | 10/1903 | Norway | 292/268 |
| 596,362 | 4/1934 | Germany | 292/268 |

Primary Examiner—M. H. Wood, Jr.
Assistant Examiner—Terrance L. Siemens
Attorney, Agent, or Firm—E. C. Goodale

[57] ABSTRACT

A vehicle dash assembly is provided with pivoting mount means which allows for greater accessibility to the dash mounted instrument and associated control members. A latching mechanism permits the dash assembly to be supported in the open position for servicing operations.

1 Claim, 3 Drawing Figures

VEHICLE DASH ASSEMBLY

BACKGROUND

This invention relates generally to vehicle dash assemblies, and more particularly to a dash assembly which may be pivoted upward to permit access therebehind for servicing and the like.

Servicing of dashboard components and the like has long been a problem. This problem exists in automobiles as well as heavy construction vehicles. In most automobiles, one must generally lie on the floor of the front seat in order to work on the underside of the dash assembly. Providing service from this position is at best most undesirable.

This problem also exists in trucks, off-highway vehicles, and heavy construction equipment. With the advent of the roll-over protection cab system, which is a superstructure by itself, the problem of servicing the dash assembly was highlighted. In the independent cab structure of the roll-over protection cab system, the under-the-dash space was substantially decreased.

Accordingly, it is an object of this invention to provide a vehicle dash assembly which will simplify the servicing of the dash assembly components mounted thereon.

Another object of this invention is to provide a vehicle dash assembly which permits servicing of the dash assembly instruments and associated control members from inside the cab.

A still further object of this invention is to provide a vehicle dash assembly which is pivotally supported and wherein the dash assembly may be pivoted upwardly for service.

SUMMARY

A vehicle dash assembly is pivotally mounted to the vehicle cab structure. Pivoting of the dash assembly permits access to the backside thereof for servicing requirements. A supporting mechanism operatively connects the hinged dash to the cab structure. The supporting mechanism permits the dash panel to be held in the open position. Bias means cooperate with the support mechanism so as to lock the dash panel in the respective open positions.

Other objects and advantages of the present invention will become more readily apparent upon reference to the accompanying drawings and following description of the exemplary embodiment thereof presented proceeds.

BRIEF DESCRIPTION OF THE DRAWINGS

The accompanying drawings show a present exemplary embodiment of this invention in which.

DESCRIPTION OF ILLUSTRATED EMBODIMENT

Figure 1:
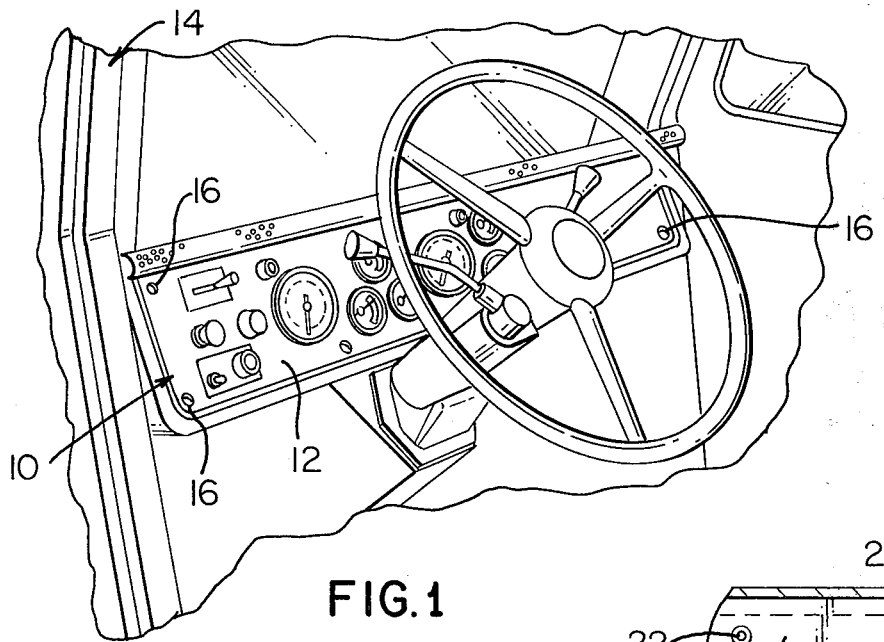
FIG. 1 is a perspective view of the dash assembly of this invention.

Reference is now made to the figures, which illustrate one exemplary embodiment of the vehicle dash assembly of this invention, which is designated generally by the reference numeral 10. As seen in FIG. 1, the dash assembly 10 is comprised of an instrument panel 12 which is mounted to the vehicle cab structure shown generally as 14. The panel 12 is secured in the operating position by a plurality of retaining screws or the like 16.

Figure 2:
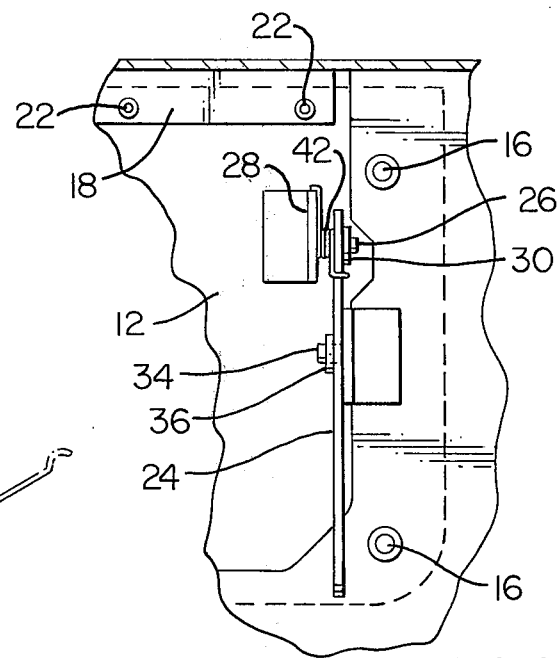
FIG. 2 is a fragmentary rear view of the dash assembly showing the supporting mechanism.
Figure 3:
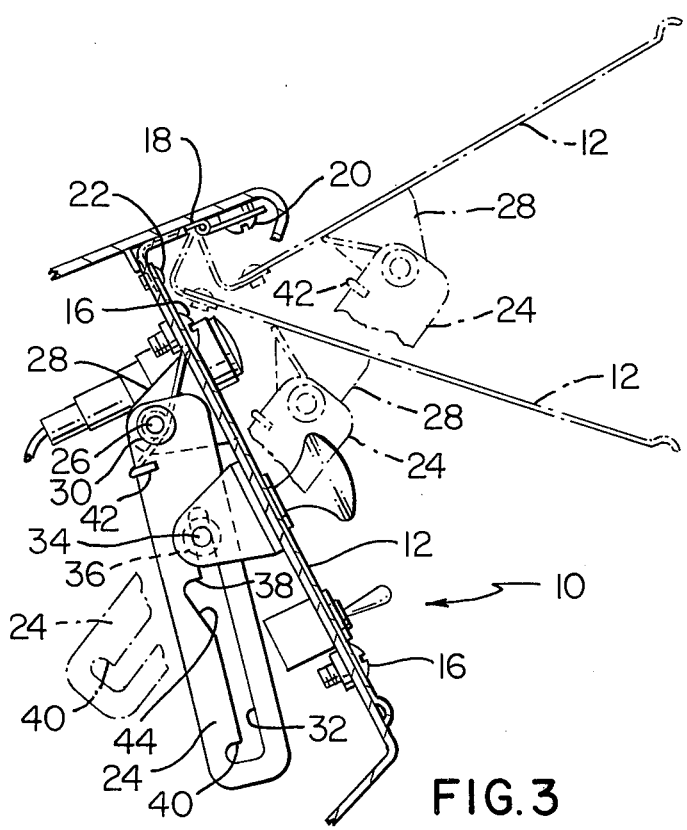
FIG. 3 is a side view of the dash assembly showing the dash assembly in a plurality of positions.

Referring now to FIGS. 2 and 3, it is seen that the instrument panel 12 is pivotally connected to the cab structure 14 by means of suitable hinge member 18. The hinge member 18 may be of any suitable type and may be a single elongated hinge or a plurality of smaller hinge members. It is only necessary that the instrument panel 12 be supported along the entire top length of the panel in a pivoting manner. The hinge 18 is secured to the cab structure 14 by means of suitable screws or the like 20. The instrument panel 12 is likewise secured to bent portion of the hinge 18 by suitable fasteners such as screws or the like 22. The hinge member 18 will permit the instrument panel 12 to be pivoted in a counterclockwise direction, as seen in FIG. 3, and shown therein in phantom lines.

An elongate prop or support member 24 is pivotally mounted at one end to a shaft or pivot pin 26. The pivot pin 26 is secured to a mounting bracket 28 which is fixedly secured to the backside of the instrument panel 12. The elongated support member 24 is held in place on the pivot pin 26 by a suitable C-clip or washer and cotter pin arrangement and shown generally by washer 30.

The support member 24 is formed with an elongated slot 32 extending therethrough. Guide means such as a shaft or pin 34 is mounted on the cab structure so as to project through the slot 32. A C-clip or washer and cotter pin arrangement may be utilized to prevent the member 24 from becoming disengaged with the pin 34. Such arrangement is shown generally by the washer 36. It is thus seen that as the instrument panel 12 is pivotally rotated in the counterclockwise direction, relative sliding between the member 24 and pin 34 will occur due to the cooperative engagement of the pin 34 with the slot 32.

The slot 32 is formed with shoulders 38 and 40 along one side thereof. These shoulders provide a means to lock the member 24 in either of two positions and thereby maintaining the instrument panel in the respective positions shown in FIG. 3.

A biasing spring 42 is mounted about the pivot pin 26. One end of the spring 42 engages the member 24 and provides a biasing force thereto. In the illustrative embodiment shown in FIG. 3, it is seen that the biasing force is generated in a counterclockwise direction about the pivot pin 26. The biasing force thus tends to urge the member 24 in a counterclockwise direction about pivot pin 26. The biasing force of the spring 42 will thus hold the member 24 in a locked condition due to the engagement of the pin 34 with the respective shoulders 38 and 40. The tapered wall 44 permits the pivot pin 34 to move therealong as the instrument panel 12 is moved from the midposition to the full open position. To close the panel 12, it is necessary to provide a counterbiasing force against the member 24 so as to disengage the pin 34 from either of the shoulders 38 or 40. This counterbiasing force is provided by the service operator.

In the illustrative embodiment shown and described, a single support member is shown. In most instances, the single supporting mechanism will be sufficient. However, it is obvious that in certain situations a second supporting mechanism may be employed at the other end of the instrument panel. In addition, the supporting member may be provided with additional shoulders therein such that a multiplicity of open positions may be utilized.

It is seen that a vehicle dash assembly is provided which may be pivoted upwardly from the operatinng position. This permits ready access to the instruments and components mounted thereon. Accordingly, the objectives hereinbefore set forth have been accomplished.

While a present exemplary embodiment of this invention has been illustrated and described, it will be recognized that this invention may be otherwise variously embodied and practiced by those skilled in the art.

What is claimed is:

1. A vehicle dash assembly in a cab area comprising:
    an instrument panel extending transversely across substantially the entire width of the cab area and upon which the vehicle instruments and associated control members are mounted, said panel having an upper side visible from the cab area and an underside;
    a hinge along the top of said panel, said hinge pivotally connecting said panel with the vehicle cab structure such that said panel is movable from a closed condition to a fully pivoted open condition;
    pivot means mounted to the underside of said panel;
    an elongated support member having one end pivotally rotatably mounted on said pivot means, said member being formed with an elongated slot;
    guide means mounted on the cab structure, said guide means cooperatively engaging said member slot wherein said member is guided by said guide means as said panel is moved from the closed condition to the open condition;
    a plurality of shoulders formed in said member elongated slot, said shoulders cooperating with said guide means to hold said panel in a corresponding open condition; and
    a bias spring mounted about said pivot means and acting against said elongated member, said spring force urging said member in a direction wherein said guide means will engage one of said plurality of shoulders such that said panel is held in the open condition.

* * * * *